Figures 1, 2:
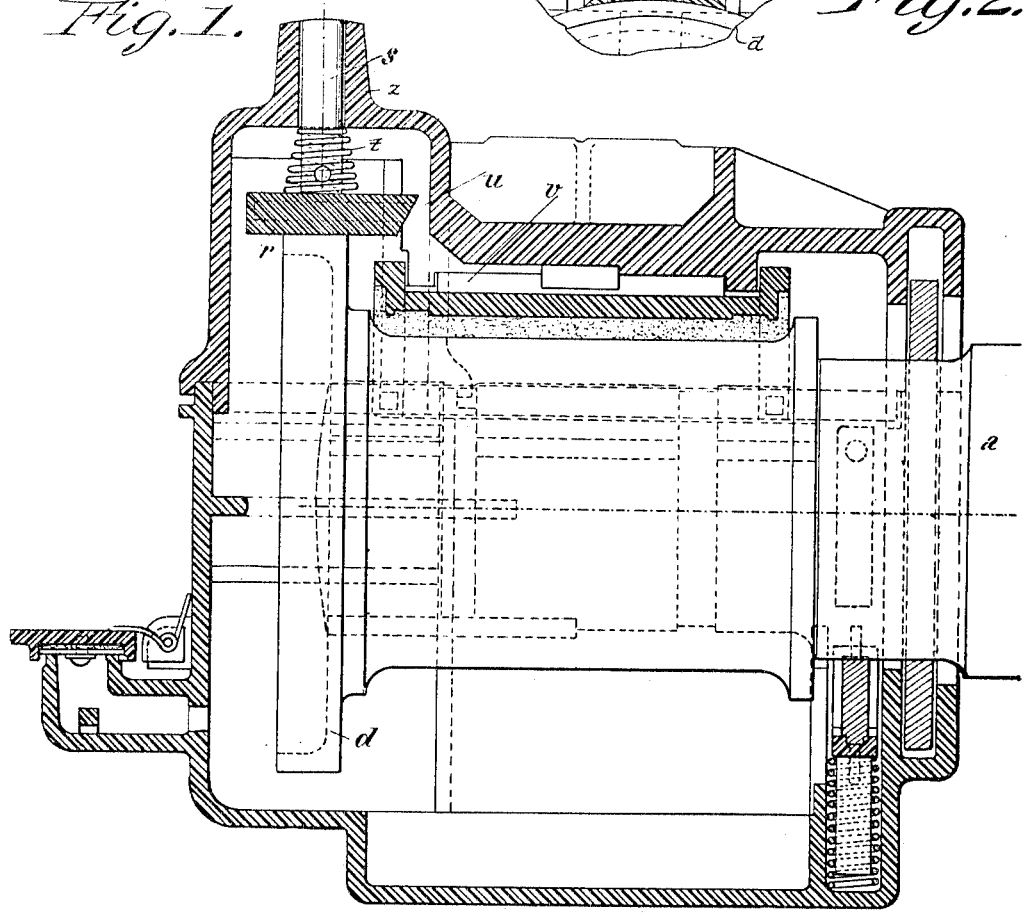

I. SZOT-CZETEN.
AXLE BOX.
APPLICATION FILED FEB. 25, 1910.

1,107,867.

Patented Aug. 18, 1914.

Witnesses:
E. W. B. Brown.
C. A. Sadler

Inventor:
Iwan Szot-Czeten
by Frank S. Appleman
Atty

UNITED STATES PATENT OFFICE.

IWAN SZOT-CZETEN, OF WARSAW, RUSSIA.

AXLE-BOX.

1,107,867. Specification of Letters Patent. Patented Aug. 18, 1914.

Application filed February 25, 1910. Serial No. 546,029.

*To all whom it may concern:*

Be it known that I, IWAN SZOT-CZETEN, a citizen of Russia, subject of the Emperor of Russia, residing at Nowowiejska 16$^b$, Warsaw, in the Empire of Russia, have invented certain new and useful Improvements in Axle-Boxes, of which the following is a full, clear, and exact description.

This invention has reference to a device for ascertaining the amount of wear in the brasses of bearings of axle arms, and consists in that the fastening pin of the part which wipes the oil from a rotary disk and conducts it to the bearing passes to the outside through the axle box; the extent to which the pin projects from the axle indicating the amount of wear of the brasses of the bearing.

The accompanying drawing illustrates the device constructed according to the present invention, Figures 1 and 2 being respectively a longitudinal and a cross section through the axle box.

The wiper $r$ is pressed down by a spring $t$ and serves to remove the oil from the plate disk $d$, which rotates with the axle $a$ and feeds the oil to the bearing $v$. The wiper is guided by a pin $s$ which slides in a corresponding hole in a shoulder $z$ formed on the lid of the axle box. According to the present invention, this hole passes completely through the shoulder, and the pin $s$ is of such length that, when the brass of the bearing $v$ is new, the pin is flush with the upper edge of the hole. Upon the axle box sinking as a result of wear in the brasses, the pin $s$ then projects a corresponding amount beyond the shoulder and indicates the amount of wear, thus avoiding the necessity of opening the axle box to inspect the bearing. The pin $s$ may be made a close fit in the shoulder so as to prevent the passage of dust or with this object a glass cap may be employed to cover the hole for the pin.

I claim—

1. The combination with an axle box having an opening therein, an axle having one end extending into the box, of a wear indicating apparatus comprising a base portion, a pin having one end secured to the base and the opposite end thereof extending through the opening in the box so that the upper edge of the pin will aline with the outer surface of the box, and means for supporting the indicating apparatus whereby the sinking of the axle box with respect to the axle, due to wear will cause the upper end of the pin to extend above the outer surface of the box.

2. The combination with an axle box having an opening therein, an axle having one end extending into the box, of a wear indicating apparatus comprising a base portion adapted to rest on a portion of the axle, a pin having one end thereof secured to the base, a coiled spring surrounding the pin, one end of the spring adapted to engage the under side of the box and the opposite end of the spring adapted to engage the base, whereby the base is held into engagement with the axle.

In witness whereof, I subscribe my signature, in presence of two witnesses.

IWAN SZOT-CZETEN.

Witnesses:
IG. TEICHFELD,
BRAIS ADAR GARDMAY.

Copies of this patent may be obtained for five cents each, by addressing the "Commissioner of Patents, Washington, D. C."